US008176353B2

(12) United States Patent
Lutscher

(10) Patent No.: US 8,176,353 B2
(45) Date of Patent: May 8, 2012

(54) METHOD FOR THE DATA TRANSFER BETWEEN AT LEAST TWO CLOCK DOMAINS

(75) Inventor: Thorsten Lutscher, Munich (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 626 days.

(21) Appl. No.: 12/355,234

(22) Filed: Jan. 16, 2009

(65) Prior Publication Data

US 2009/0193285 A1    Jul. 30, 2009

(30) Foreign Application Priority Data

Jan. 17, 2008   (DE) .......................... 10 2008 004 857

(51) Int. Cl.
*G06F 1/04*   (2006.01)
(52) U.S. Cl. ........................................ 713/600; 713/400
(58) Field of Classification Search .................. 713/400, 713/401, 503, 600; 712/225; 327/141, 144, 327/153, 161
See application file for complete search history.

(56) References Cited

U.S. PATENT DOCUMENTS

| | | | |
|---|---|---|---|
| 5,931,938 A | 8/1999 | Drogichen et al. | |
| 6,366,991 B1 | 4/2002 | Manning | |
| 6,516,420 B1 | 2/2003 | Audityan et al. | |
| 6,668,335 B1 | 12/2003 | Breach et al. | |
| 6,907,538 B1 | 6/2005 | Boutaud | |
| 6,948,017 B2 | 9/2005 | Carpenter et al. | |
| 2002/0083298 A1* | 6/2002 | Cook et al. ...................... | 712/25 |
| 2005/0060597 A1* | 3/2005 | Albonesi et al. .............. | 713/600 |
| 2005/0220196 A1 | 10/2005 | Okada | |
| 2006/0076988 A1* | 4/2006 | Kessels et al. ................ | 327/144 |
| 2006/0161797 A1* | 7/2006 | Grass et al. ................... | 713/400 |
| 2007/0081414 A1* | 4/2007 | Douady et al. ................ | 365/233 |

(Continued)

FOREIGN PATENT DOCUMENTS

DE          69030523 T2     4/1997

(Continued)

OTHER PUBLICATIONS

Two Efficient Synchronous Asynchronous Converters Well-Suited for Network on Chip in GALS Architectures, Sheibanyrad et al., The University of Pierre and Marie Curie, pp. 191-202, 2006.*

(Continued)

*Primary Examiner* — Khanh Dang
(74) *Attorney, Agent, or Firm* — DLA Piper LLP (US)

(57) ABSTRACT

The invention describes a method for transferring data between a first clock domain having a first clock rate (CLK1) and at least one additional clock domain having a second clock rate (CLK2), comprising the following for the transfer of data from the first to the second clock domain (CLK1, CLK2):

reading in of a data item in accordance with the first clock rate (CLK1) into a first memory (11), and locking of the first memory after saving the data item, signalizing a transfer start after saving the data item in the first memory (11) by means of a transfer start signal (TS), reading out the data item from the first memory, and reading in the data item into a second memory, each according to the second clock signal (CLK2), processing the transfer start signal (TS) according to the second clock signal (CLK2) for generating a transfer end signal (TD), processing the transfer end signal (TD) according to the first clock signal (CLK1) for generating a release signal (TD') and releasing the first memory as a function of the release signal (TD').

15 Claims, 8 Drawing Sheets

U.S. PATENT DOCUMENTS

| | | | | |
|---|---|---|---|---|
| 2008/0159454 A1* | 7/2008 | Ye et al. | | 375/354 |
| 2008/0294803 A1* | 11/2008 | Mangano et al. | | 710/15 |
| 2008/0294879 A1* | 11/2008 | Wielage | | 712/225 |
| 2009/0150706 A1* | 6/2009 | Oh et al. | | 713/400 |
| 2010/0111117 A1* | 5/2010 | Kolinummi et al. | | 370/503 |

FOREIGN PATENT DOCUMENTS

| | | |
|---|---|---|
| DE | 10048732 | 4/2002 |
| EP | 0322116 B1 | 1/2000 |

OTHER PUBLICATIONS

Clock Synchronization through Handshake Signalling, Kessels et al., IEEE, 2002.*

Sheibanyrad, et al.; "Two efficient synchronous asynchronous converters well-suited for networks-on-chip in GALS architectures"; Integration, The VLSI Journal, North-Holland Publishing Company, Amsterdam, NL, vol. 41, No. 1, Sep. 14, 2007, pp. 17-26.

Jens Sparso Ed—Mehmood-Ur-Rehman Awan, et al.; "Asynchronous design of networks-on-chip"; Norchip, 2007, IEEE, Piscataway, NJ, USA; Nov. 19, 2007, pp. 1-4.

European Search Report dated Jun. 19, 2009 for European Patent Application No. 09150626.1-2212.

English translation of the European Search Report dated Jun. 19, 2009 for European Patent Application No. 09150626.1-2212.

Office Action issued by the German Patent Office in Corresponding German Application No. 10 2008 004 857.7-53 (Nov. 19, 2008).

* cited by examiner though page 1

METHOD FOR THE DATA TRANSFER BETWEEN AT LEAST TWO CLOCK DOMAINS

PRIORITY CLAIMS/RELATED APPLICATIONS

This application claims priority under 35 USC 119 to German Patent Application Serial No. 102008004857.7 filed on Jan. 17, 2008.

The invention relates to a method for the data transfer between at least two clock domains.

Electronic systems having multiple processors, so-called multi-processor systems, may have the problem that individual processors or groups of individual processors belong to different clock domains, e.g. operate at different clock sequences. The individual clock sequences may differ with regard to their frequency and/or with regard to their phase positions. Such a multi-processor system is, for example, a so-called system-on-chip (SoC), which has a central processing unit (CPU), and at least one processing unit (PU) connected to the CPU via a bus system. During operation the processing units can generate data, such as measuring data, which are to be supplied to the CPU. Furthermore, the operating mode of the at least one PU may depend on one or more changeable operating parameters generated by the CPU and to be supplied to the PU.

In order to exchange data between processors having different clock domains, DE 100 48 732 A1 provides a central register, to which the individual processors may gain access using their clock frequencies, and to provide so-called shadow registers to the processors, which serve for the intermediate storage of the data. However, providing three registers requires a lot of space, and is therefore expensive.

U.S. Pat. No. 6,948,017 B2 provides the generating of a mutual clock rate for two processors generally operating at different clock frequencies, during a time frame, during which the processors communicate with each other, according to which mutual clock rate the two processors operate during the time frame of the data exchange.

It is the object of the present invention to provide a simple and sturdy method for a data transfer between two clock domains.

The object is solved according to a method according to claim 1. Embodiments and further improvements are the subjects of sub-claims.

According to an example of the method according to the invention for the data transfer between a first clock domain having a first clock rate and at least one other clock domain having a second clock rate, the following is provided for the data transfer from the first to the second clock domain: the reading in of a data item in accordance with the first clock rate into a first memory, and locking of the first memory after saving the data item; generating a transfer start signal after saving the data item in the first memory; reading out the data item from the first memory, and reading in the data item into a second memory, each according to the second clock signal; processing the transfer start signal according to the second clock signal for generating a transfer end signal; processing the transfer end signal according to the first clock signal for generating a release signal and releasing the first memory as a function of the release signal.

Examples of the present invention are explained in further detail based on the figures, below. In this context it should be noted that the figures serve for illustrating a basic principle of the invention such that only those components are illustrated that are necessary for appreciating said basic principle.

Unless otherwise stated, the same reference symbols in the figures denote equal parts and signals having the same meaning.

FIG. 1 schematically illustrates a data processing device having multiple clock domains and an interface circuit arranged between the clock domains.

FIG. 2 schematically illustrates an example of the interface circuit, having a first and a second processing and memory circuit.

Figure 9:
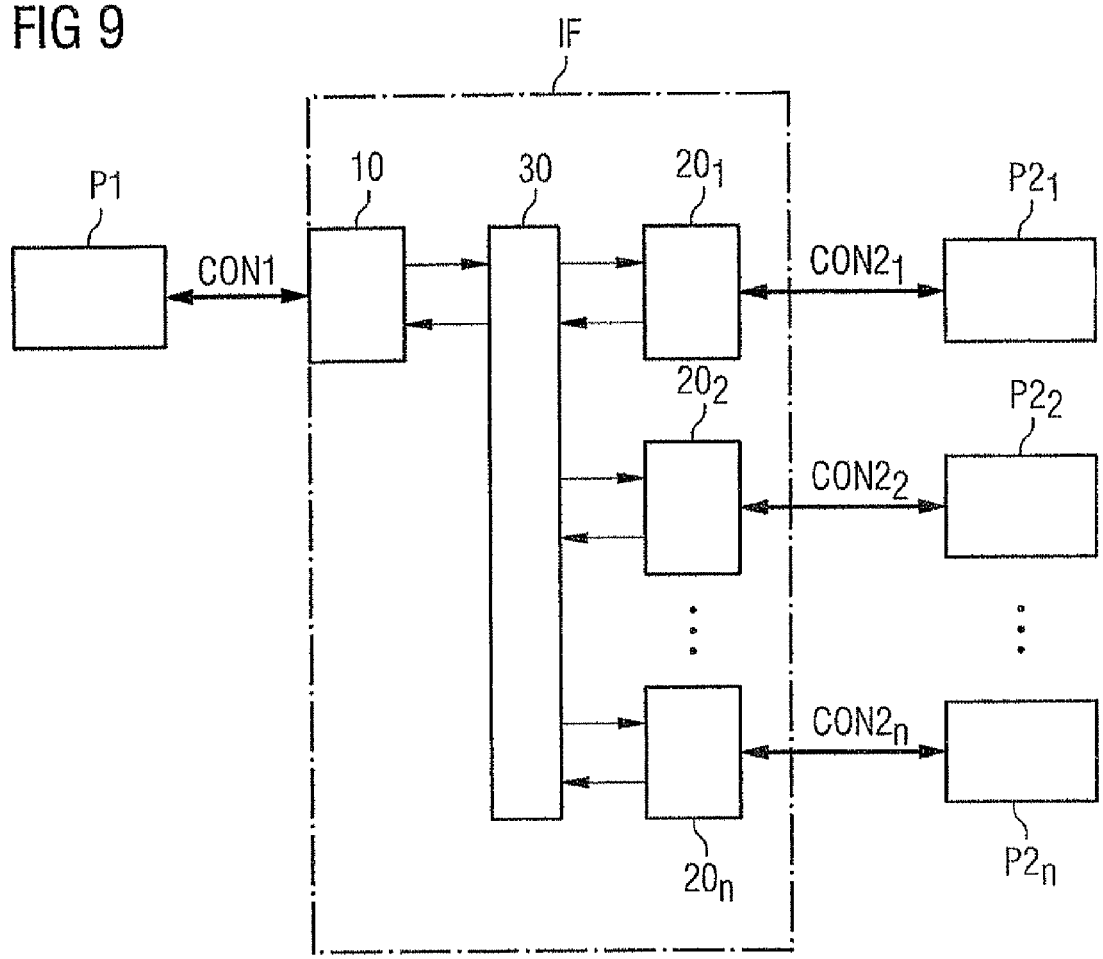

FIG. 9 schematically illustrates a data processing device having more than two clock domains and an interface circuit arranged between the first clock domain and the additional clock domains.

Figure 10:
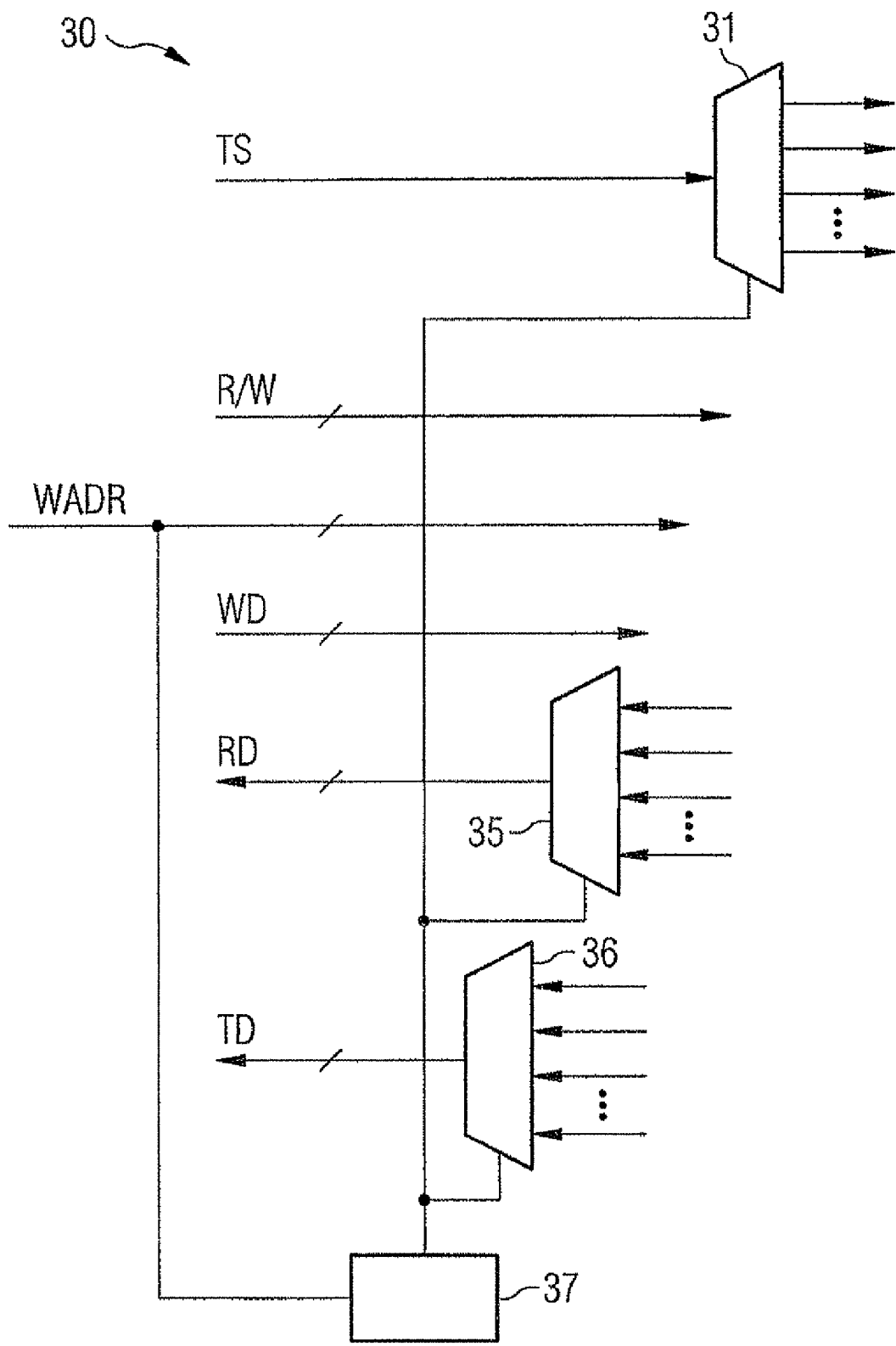

FIG. 10 shows an alternate realization example of part of the interface circuit illustrated in FIG. 9.

Figure 1:
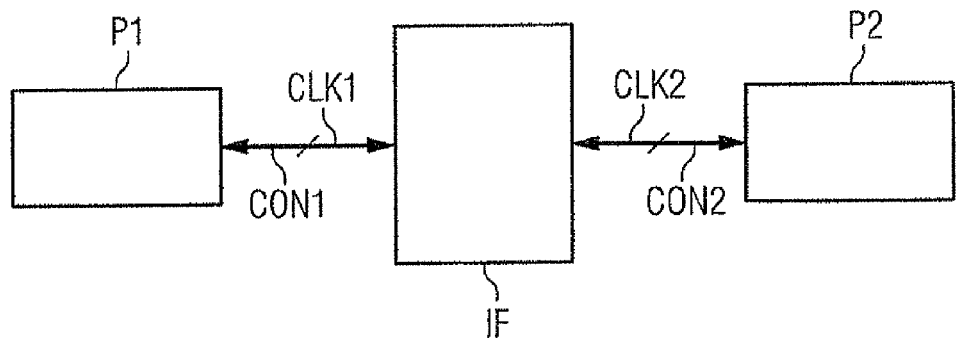

FIG. 1 schematically illustrates an example of a data processing device having multiple—in the illustrated example two—clock domains having different clock rates CLK1, CLK2. Each of the clock domains has a processor P1, P2. A first processor P1 of the data processing device is configured in order to process or provide data at the clock rate of the first clock signal CLK1. A second processor P2 of the second clock domain is configured in order to process or provide data at the clock rate of the second clock signal CLK2. The illustrated data processing device is, for example, a so-called system-on-chip (SoC). The first processor P1 in this system may be a central processing unit (CPU), which controls the data processing device comprising the illustrated multiple clock domains.

The second processor P2 in such an SoC is, for example, a micro-controller, or a signal processing processor, however, it may also be a purely hardware based data processing unit operating without any software, and thus is not programmable. Irrespective of the type of realization, the denotation of "second processor" shall be used herein for the data processing unit arranged in the second clock domain. Said second processor P2, for example, may be realized such that different operating modes or functions may be set via configuration values, or configuration parameter, respectively. Said configuration values are stored during the operation of the micro-controller, for example, in a register, onto which the micro-controller gains access for setting the respective operating mode. Depending on the respective application, it may be desired to set or change said configuration parameters by means of the first processor P1. This requires a data transfer from the first processor P1 to the micro-controller P2 across a "domain limit" between both clock domains. An interface circuit IF is present for such a data transfer between both processors P1, Ps of the different clock domains in the data processing device illustrated in FIG. 1, which is connected to the first processor P1 via a first data connection CON1, and to the second processor P2 via a second data connection CON2. The data connections CON1, CON2 may be particularly realized as data busses, via which data can be transferred at the clock rate of the respective clock domain, e.g. via the first data connection CON1 at the first clock rate CLK1, and via the second data connection CON2 at the second clock rate CLK2. For this purpose it is the task of the interface circuit to enable data communication of both processors P1, Ps across the clock domain limits, wherein the first and the second clock rates may be at any desirable clock ratio to each other.

For reasons of simplifying the illustration, the device according to FIG. 1 is shown as having only one processor P1 of the first clock domain, and a processor P2 of the second clock domain. Of course, the invention is not limited to the use of only one process at one clock domain, but may also be applied to data processing devices having more than one processor at the second clock domain, and also having more than two clock domains. Furthermore, both processors may also be located in the same clock domain.

Figure 2:
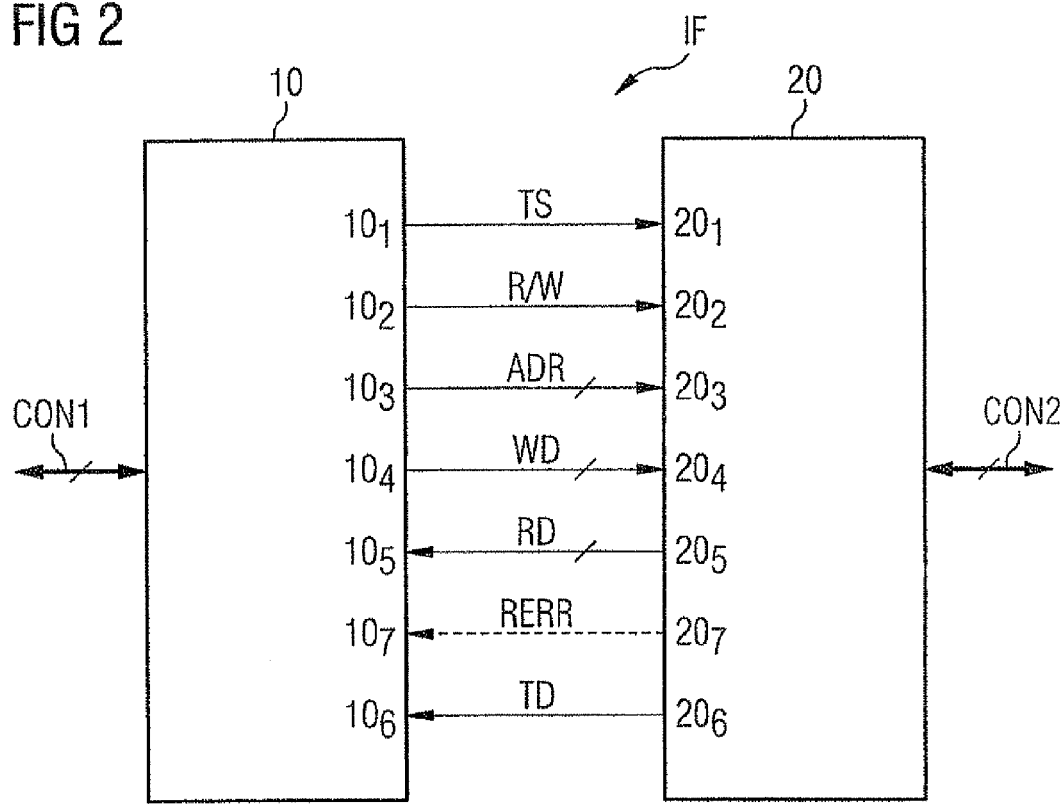

One example of an interface circuit IF enabling data communication across the domain limit is schematically illustrated in FIG. 2. The illustrated interface circuit IF has a first processing and memory circuit 10 being connected to the first data connection CON1, and a second processing and memory circuit 20 being connected to the second data connection CON2. The following explanation assumes as an example that the data to be exchange between the first and the second clock domains is register data, which is either to be generated by the first processor P1 and stored in the second clock domain, or which is read out from a register in the second clock domain and is to be transferred to the first processor P1. Said register is arranged, for example, in the second processing and memory unit 20. The data to be supplied by the first processor P1 and to be written into the register is, for example, configuration data for processors or micro-controllers (such as the processor P2 illustrated in FIG. 1) present in the second clock domain, or is a result value written into the register by means of the processors arranged in the second clock domain, and is to be transferred to the processor P1 at the first clock domain for further processing. The information supplied to the first processor by the second processor P2 is, for example, status information on computer operations being performed by the second processor P2.

The data processing device illustrated, for example, is a video signal processing device, wherein the second processor P2 optionally processes the video signal (not illustrated) supplied to the same together with additional processors (not illustrated). Such processing comprises, for example, an interlacing interpolation in a de-interlacing method, or a movement directional interpolation of intermediate images at a 50 Hz-100 Hz conversion. The configuration data supplied by the first processor forms the parameters for said video signal processing.

For further explanation it should also be assumed that writing and reading access to the register of the second clock domain is controlled by the first processor P1. For writing access to said register the first processor P1 outputs a data succession via the first data connection CON1, which contains at least the following data/information: a write instruction, a register address, and a user data item. The register address states at which memory location of the register arranged in the second clock domain the user data item should be written. The data succession provided by the first processor may be transferred in series; however, said data communication is carried out particularly in parallel in favor of a higher transfer speed, e.g. simultaneously via multiple parallel lines mutually forming the first data connection CON1. Accordingly the second data connection may be a series or parallel data connection. For reading access to the register arranged in the second clock domain, the data succession transferred from the first processor P1 to the first processing and memory circuit 10 comprises the following data/information: a read instruction, a register address stating the address at which the register is to be read out.

The following signal connections are present between the first processing and memory unit 10 and the second processing and memory unit 20 in the illustrated example for the above explained register operations, e.g. a write access and a read access to the register arranged in the second clock domain:

an instruction connection between the instruction output $10_2$ of the first unit 10 and an instruction input $20_2$ of the second unit 20;

an address connection between an address output $10_3$ of the first unit 10 and an address input $20_3$ of the second unit 20;

a first data connection between a data output $10_4$ of the first unit 10 and a data input $20_4$ of the second unit 20; and a second data connection between a data output $20_5$ of the second unit 20 and a data input $10_5$ of the first unit 10.

A read or write instruction RAN is transferred from the first unit 10 to the second unit 20 via the instruction connection, which states whether a value should be written into the register present in the second clock domain, or whether a value should be read out from said register. The address of the register position, which is to be read into the user data item or from which a data item is to be read out, is transferred via a the address connection. Data items to be read into the register are transferred from the first unit 10 to the second unit 20 via the first data connection, while values read out from the register and transferred from the second unit 20 to the first unit 10 via the second data connection. In this context it should be noted that instead of two data connections, which are each utilized in only one direction—unidirectional—a data connection could also be provided, which is utilized in both directions—bidirectional—, wherein the value of the write or read instruction RAN purports the direction of transfer.

The first processing and memory unit 10 is configured to buffer data from the first processor P1, which is to be stored in the register of the second clock domain, and to also buffer data to be transferred from the register arranged in the second clock domain to the first processor P1. In order to enable error-free data communication across the domain limit extending between the first processing and memory unit 10 and the second processing and memory unit 20, first and second signaling connections are present between the first unit 10 and the second unit 20. A first signaling connection between a signaling output $10_1$ of the first unit 10 and a signaling input $20_1$ of the second unit 20 serves for transferring a transfer start signal TS indicating to the second unit 20 if data buffered in the first unit 10 is available in order to be read into the register arranged in the second clock domain. A transfer end signal TD is transferred from the second unit 20 to the first unit 10 via the second signaling connection, when the process is completed, by means of which the data buffered in the first unit 10 is written into the register. In the case of a write process the start signal TS signalizes that the data item to be written into the register, and the register address, to which the data item is to be written, is buffered in the first unit. In the case of a read access, wherein data is to be read out from the register, the start signal TS signalizes that the register address, at which the register is to be read out, is buffered in the first unit 10.

Optionally, additional signalizing connections may be present between the first and the second units 10, 20, such as a third signalizing connection between a second signalizing output $20_7$ of the second unit 20 and a second signalizing input $10_7$ of the first unit 10. For example, a read error signal RERR is transferred via said third signalizing connection, which signalizes, whether a read process has been carried out with or without errors. A signal level of said signal RERR, representing a read error, is generated in a manner not explained in detail, for example, if a register address, at which a value is to be stored, does not exist.

Figure 3:
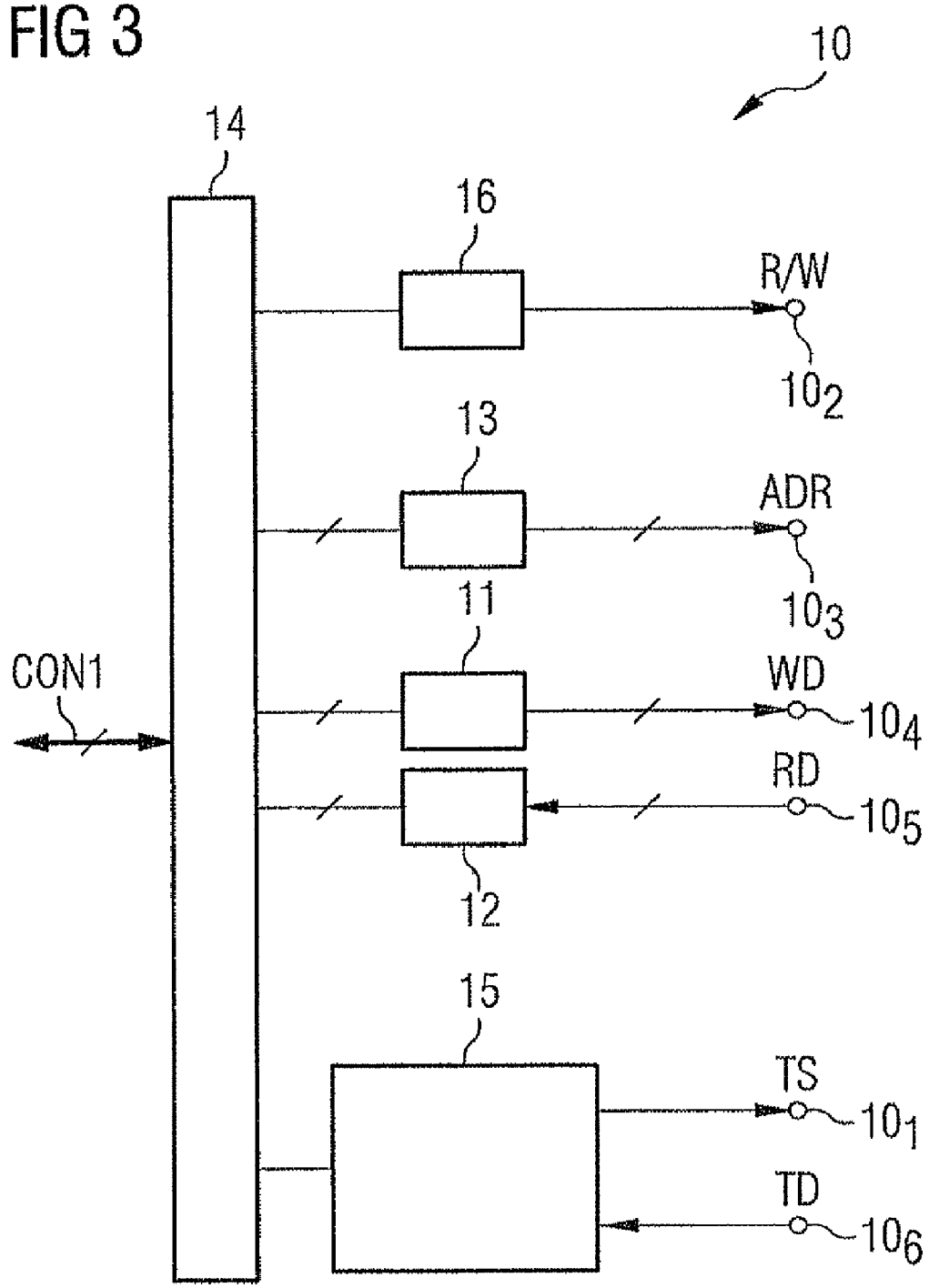
FIG. 3 shows an example of the first processing and memory circuit in detail.

Possible realization examples of the first and second processing and memory unit 10, 20 explained above are described below based on FIGS. 3 and 4, wherein said units 10 (in FIG. 3) and 20 (in FIG. 4) are schematically illustrated as block diagrams. The first processing and memory unit 10 illustrated in FIG. 3 has a first data memory 11 and a second data memory 12, each for the buffering of a data item, such as a data item of the length n bits, and an address memory 13 for the buffering of a register address, such as a register address of the length m bits. The first data memory 11 serves for the buffering of a data item provided by the first processor P1 via the first data connection CON1, which is to be stored in the register arranged in the second clock domain. A control circuit 14 is arranged between the data connection CON1 and the first data memory 11, which controls the function of the first processing and memory unit 10, and which is configured to extract the data item to be read into the register from the data sequence provided by the first processor P1 via the first data connection CON1 in case of a read access, and to buffer the same in the first data memory 11. WD denotes a data item stored in the first data memory 11 and present at the data output $10_4$. The control circuit 14 is further configured to extract the address data from this data sequence, and to buffer the same in the address memory 13. ADR denotes a register address stored in the address memory and present at the address output $10_3$.

Furthermore, the control circuit 14 extracts the write/read signal from the data sequence provided by the first processor P1 and provides the same at the instruction output $10_2$ of the first unit 10. For this purpose an additional memory 16 is present, which switched between the control circuit 14 and the instruction output, and in which the write/read signal is stored during a write or read process. The second data memory 12 serves for the buffering of a data item read out from the register, being available at the data input $10_5$ during a read process. The control circuit 15 is configured to put out the data item stored in the second data memory 12 to the first data connection CON1 for the first processor P1.

The first processing and memory unit 10 further has a first signaling circuit 15, which generates the transfer start signal TS at the signaling output $10_1$ in a controlled manner via the control circuit 14, and which is configured to process the transfer end signal available at the signalizing input $10_6$. The construction and the mode of operation of said first signalizing circuit 15 is further explained below.

Figure 4:
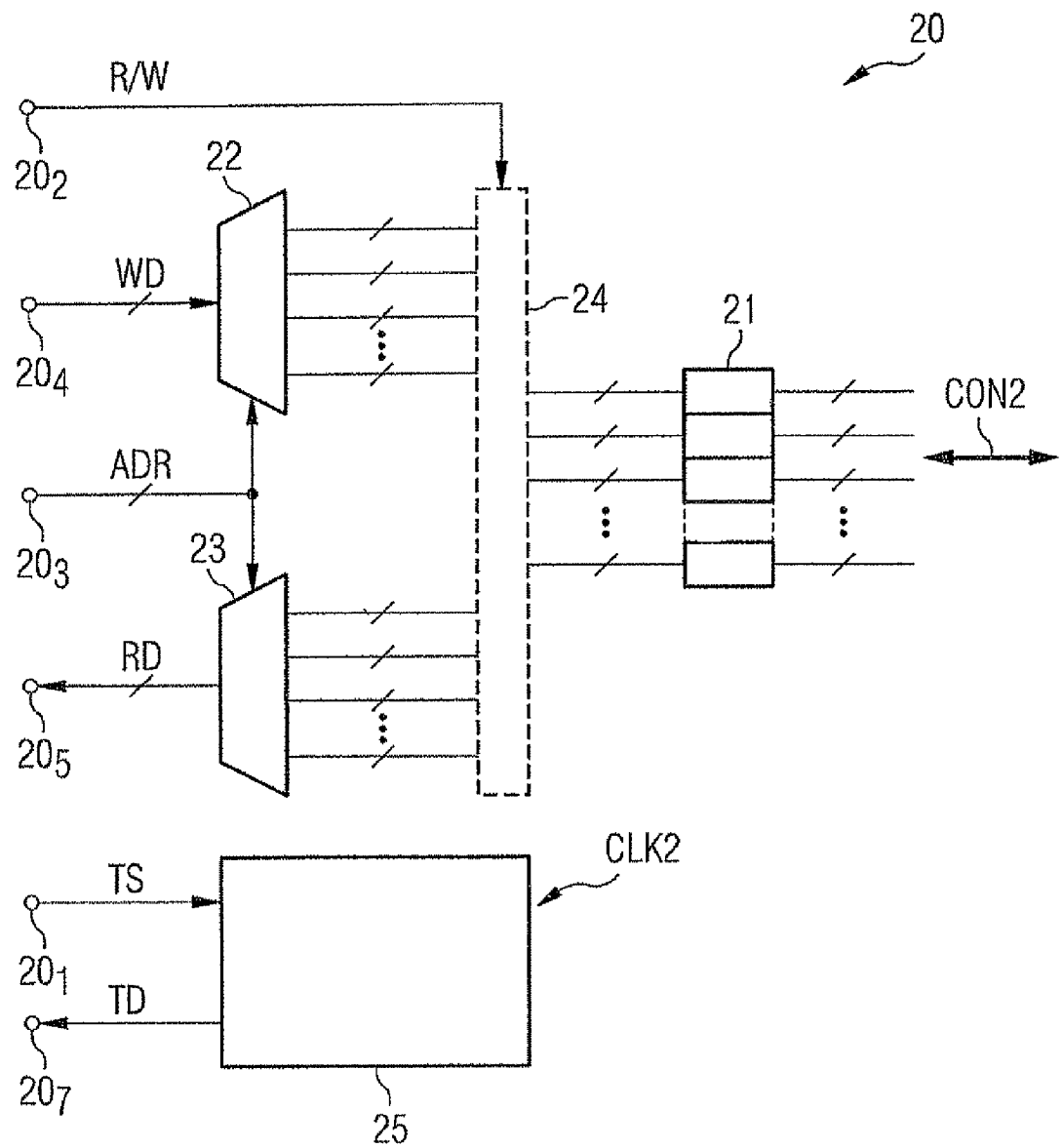
FIG. 4 shows an example of the second processing and memory circuit in detail.

With reference to FIG. 4, the second processing and memory circuit 20 has the register 21 explained above, to which the at least one processor P2 arranged in the second clock domain has access via the second data connection CON2. The register 21 has a number of memory locations, each serving for the storage of a data item, and each being addressable separately via the register address ADR. The second processing and memory unit 20 further as a first multiplexer 22 having an input and a plurality of outputs, and a second multiplexer 23 having a plurality of inputs and one output. The input of the first multiplexer 22 is connected to the data input $20_4$ of the second unit 20 in the example illustrated. The first multiplexer 22 is configured to provide a write data item WD present at the input of the multiplexer 22 to one of the outputs thereof as a function of the address signal ADR present at the address input $20_3$. For this purpose each of the outputs of the first multiplexer 22 is either firmly connected to one of the memory locations of the register 21, or can be connected to one of said memory locations of the register 24 via an optionally available multiplexer 24 to be explained in further detail below. The inputs of the second multiplexer 23 are each either firmly connected to one of the memory locations of the register 21, or can be connected to one of said memory locations via the optionally available further multiplexer 24. The second multiplexer 23 is configured to connect one of the inputs thereof to the output thereof as a function of the address signal ADR in order to provide the data item RD to the data output $20_5$ of the second unit 20 present at said input and read out from the register 21.

There are different variations for the allocation of the register memory locations to the outputs of the first multiplexer 22, or to the inputs of the second multiplexer 23:

In a first variation memory locations of a first group of memory locations are firmly connected to the outputs of the first multiplexer 22, and thus can be exclusively written upon via said multiplexer 22; and memory locations of a second group of memory locations are firmly connected to the inputs of the multiplexer 23, and thus can be exclusively read out via said multiplexer 23. The second group of memory locations, which are read out only via the multiplexer, and which contain the data previously provided by the second processor P2, is optionally available. Said memory locations may be omitted, if the data to be transferred to the first processor is directly provided by the second processor P2 during a read process.

The first group of memory locations, for example, comprises memory locations for the storage of configuration parameters of the at least one processor P2 present in the second clock domain. The second group of memory locations, for example, serves for the storage of result values provided by the at least one processor available in the second clock domain. The read out of the data items stored in the first group of memory locations by the at least one second processor P2 and the reading in of data items by the at least one second processor P2 into the second group of memory locations is carried out by a logic circuit that is not illustrated in detail. The mode of operation and construction of such a logic circuit are generally known such that detailed explanations can be omitted in this regard.

A second variation provides that memory locations are optionally writeable with data of the first processor via the first multiplexer 22, and can be read out by the at least one second processor P2, or that the first processor P1 can read out the data previously written into said memory locations via the second multiplexer. For this purpose the optionally available additional multiplexer 24, which is controlled by means of the write/read signal RAN, connects either the outputs of the first multiplexer 22 for writing data to the register memory locations, or the inputs of the second multiplexer 23 for the read out of data from the register memory locations to said register memory locations.

A third variation is a combination of the first and second variations, e.g. memory cells are available, which are written only via the first multiplexer 22, and are read by the at least one second processor P2; memory cells that are written only by the at least one second processor P2 and are read via the second multiplexer 23; and memory cells, being both writeable and readable via the first processor P1 and are readably only by the second processor P2.

The second processing and memory unit 20 further has a second signalizing circuit 25 being configured to process the transfer start signal TS available at the signalizing input $20_1$, and to generate the transfer end signal TD provided at the signalizing output $20_7$.

Figure 8:
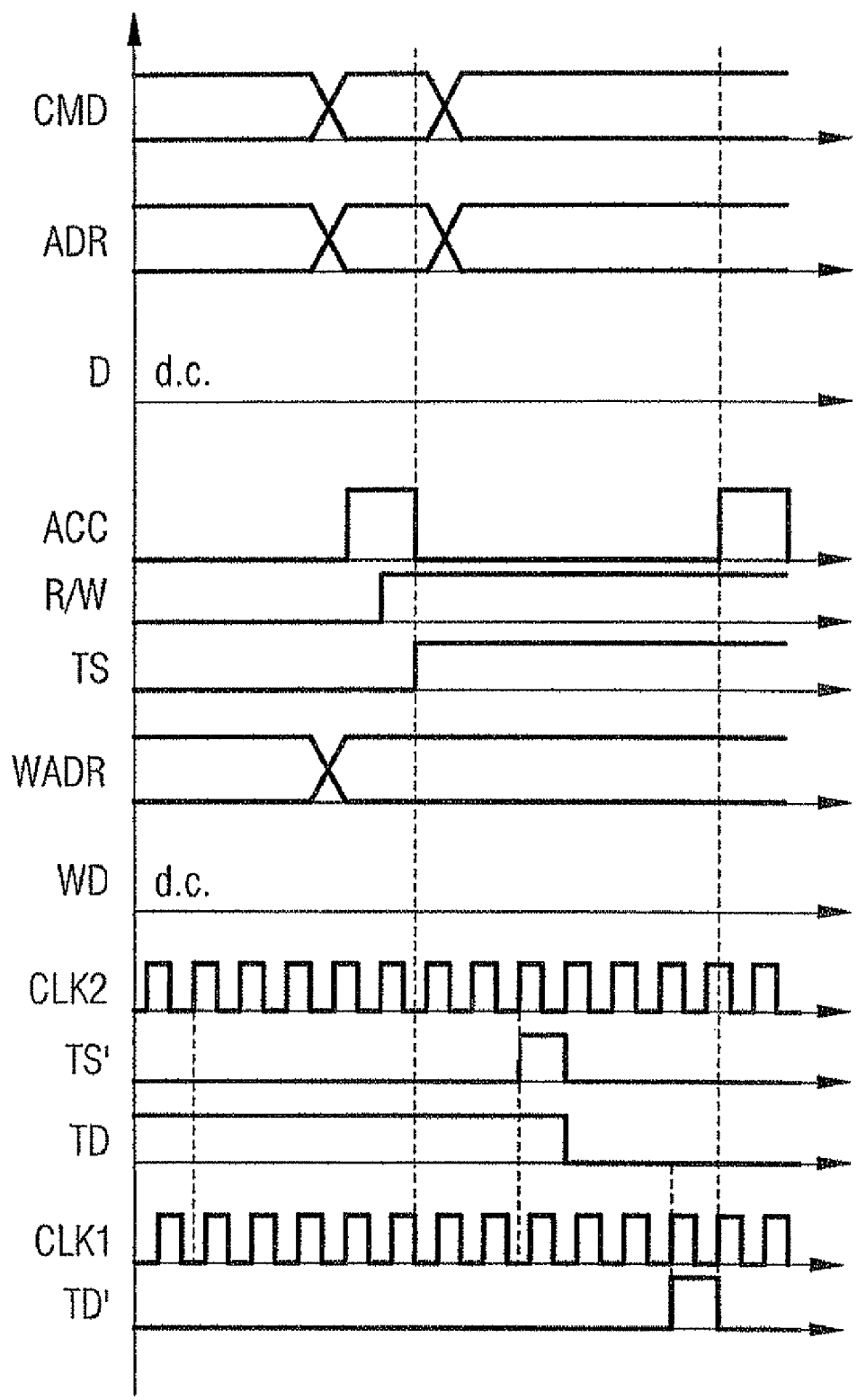
FIG. 8 shows chronological processes of signals occurring in the interface circuit for the purpose of illustrating a method for the data transfer from a second clock domain to a first clock domain.

The mode of operation of the interface circuit IF explained above based on FIGS. 2 to 4 is further explained in detail below based on chronological signal forms illustrated in FIG. 5. The chronological signal forms illustrated in FIG. 5 relate to a write process, wherein data supplied by the first processor P1 are written into the register (21 in FIG. 4) arranged in the second clock domain. Chronological signal forms for a read process, wherein data is read from the register, are illustrated in FIG. 8 to be described below.

It should be assumed for the purpose of the following explanation that a write instruction, address data, and user data to be written into the register are transferred during a write process from the first processor P1 to the interface circuit IF via the first data connection CON1. Said data transferred from the processor P1 is illustrated in Figure in the upper three chronological diagrams. For this purpose CMD describes an instruction signal containing the write or read instruction, ADR' denotes address data stating the address of the register memory location, at which the user data is to be stored. D denotes the user data to be stored in the register. In the manner already explained, the control circuit 14 is configured to store the user data in the first data memory (11 in FIG. 3), the address data in the second data memory (13 in FIG. 3), and to provide the instruction contained in the instruction signal CMD to the instruction output $10_2$. t1 denotes a point in time in FIG. 5, at which the user data is stored in the first memory 11 and the address data is stored in the second memory 13, and from which the write instruction is available at the instruction outlet $10_2$ at the latest. The control circuit 14 transmits a confirmation to the first processor via the first data connection CON1 at this time, which confirms the receipt of the data. In the example illustrated said confirmation is a falling edge of a confirmation signal ACC. Simultaneously, the first and second data memories are locked at this point in time t1 against further writing with data, or against any modification of the stored data. For purposes of explanation it should be assumed that the confirmation signal ACG assumes a low level, if the memories 11, 13 are locked against writing with data, and that the confirmation signal ACC assumes a high level, if the memories 11, 13 are released for writing with data.

From the point in time t1 at the latest, the data item WD previously written in this memory 11 is permanently available at the output of the first memory 11, and the address data ADR previously stored in said address memory is permanently available at the output of the second memory 13. The write/read signal R/W is selected in the illustrated example such that the same assumes a low level for a write process, and a high level for a read process (compare to FIG. 8).

Once the user data is stored in the first memory 11 and the address data is stored in the address memory 13, the first signalizing circuit 15 signalizes the second processing and memory unit 20 in a manner controlled by the control circuit 14 that data is available both in the first data memory 11 and in the address memory 13, which may be read and processed. Said signalizing is carried out in the illustrated example by means of a level change of the transfer start signal TS. Said level change occurs, for example, at the same time as the first memory 11 and the address memory 13 are locked, i.e. in the example at a falling edge of the confirmation signal ACC. However, said signalizing could also occur at a later time.

The transfer start signal TS changes the level thereof only once per write or read operation. In the signal forms illustrated in FIG. 5 the level change of the transfer start signal TS is a change from a low level to a high level at the point in time t1, at the beginning of the next write or read operation (not illustrated) said level change is a change from a high level to a low level.

Figure 5:
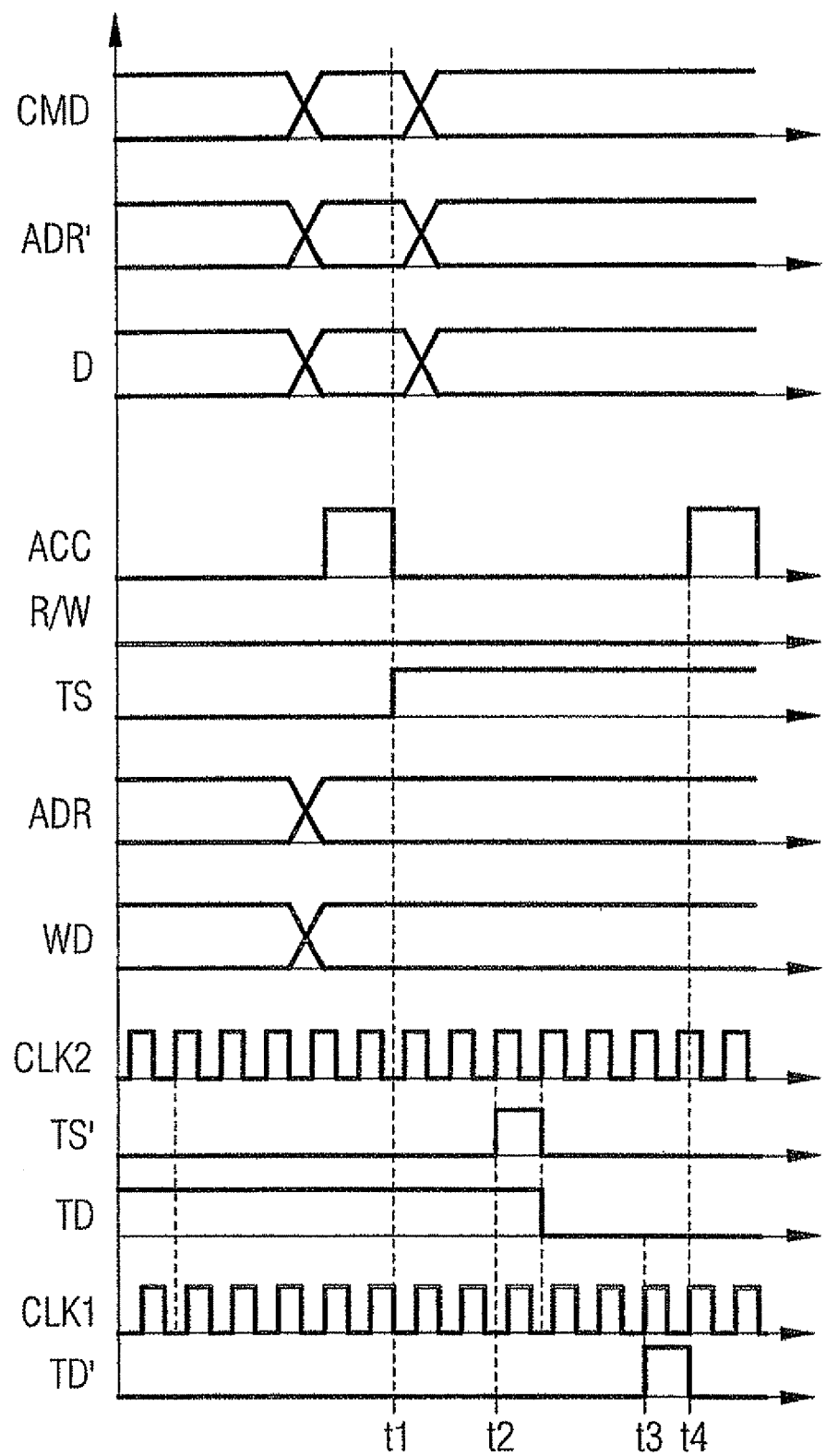
FIG. 5 illustrates chronological processes of signals occurring in the interface circuit for the purpose of illustrating a method for the data transfer from a first clock domain to a second clock domain.

CLK1 and CLK2 denote in FIG. 5 the first clock signal of the first clock domain and the second clock signal of the second clock domain. In the example illustrated said clock signals CLK1, CLK2 have the same clock frequency, but are phase shifted against each other. However, the invention functions in the same manner for the first and second clock signals having different clock frequencies, which may then be at any desired frequency and phase ratio to each other (not illustrated).

The transfer start signal TS is processed in the second processing and memory unit 20 according to the second clock signal CLK2 via the second signalizing circuit (25 in FIG. 4). Said processing is carried out in the example illustrated such that after completion of a predetermined amount of clock period of the second clock signal CLK2 the end of the read operation is signalized to the first processing and memory unit 10 after the level change of the transfer start signal TS. Said signalizing is carried out by means of the transfer end signal TD transferred by the second signalizing circuit 25 to the first signalizing circuit 15, specifically via a level change of said transfer end signal TD. In accordance with the transfer start signal TS the transfer end signal TD changes the level thereof only once during a read process or during a write process. Therefore, information is transferred only by means of the level change via said signals TS, TD, not by means of the current level thereof.

In the example illustrated in FIG. 5 a first predetermined amount of clock periods of the second clock signal CLK2 is waited for after the level change of the transfer start signal TS until an end of the transfer to the first processing and memory unit 10 is signalized by means of a level change of the transfer end signal TD. In the example a level change of the transfer end signal TD is generated at the beginning of a fourth clock period of the second clock signal CLK2 after the level change of the transfer start signal.

The transfer end signal TD is processed in the first processing and memory unit 10 in accordance with the first clock signal CLK1. In the example illustrated a predetermined amount of clock periods of the first clock signal CLK1 is waited for after the level change of the transfer end signal TD until the first memory 11 and the address memory 13 are released for new writing. This is represented in FIG. 5 at the point in time t4 by a rising edge of the confirmation signal ACC.

The generation of a level change of the transfer end signal TD as a function of the transfer start signal TS and the second clock signal CLK2 occurs in the example illustrated utilizing a first subsidiary signal TS'. Said first subsidiary signal TS' is a signal impulse, the duration of which corresponds to that of a clock period of the second clock signal CLK2. In the example illustrated the signal impulse of the first subsidiary signal TS' is generated at the beginning of the third clock period of the second clock signal CLK2 after the level change of the transfer start signal TS.

The level change of the transfer end signal TD is delayed as opposed to the beginning of a signal impulse of the subsidiary signal TS' in the example illustrated such that a level change of the transfer end signal TD is present after the beginning of the signal impulse of the subsidiary signal TS'. For the current example this results in the previously explained total delay of four clock periods between the level change of the transfer start signal TS and the level change of the transfer end signal. It should be noted that said delay of four clock periods between a level change of the transfer start signal TS and a level change of the transfer end signal is to be understood merely as an example, and that the delay of the frequency and phase difference depends on CLK1 and CLK2.

Figure 6:
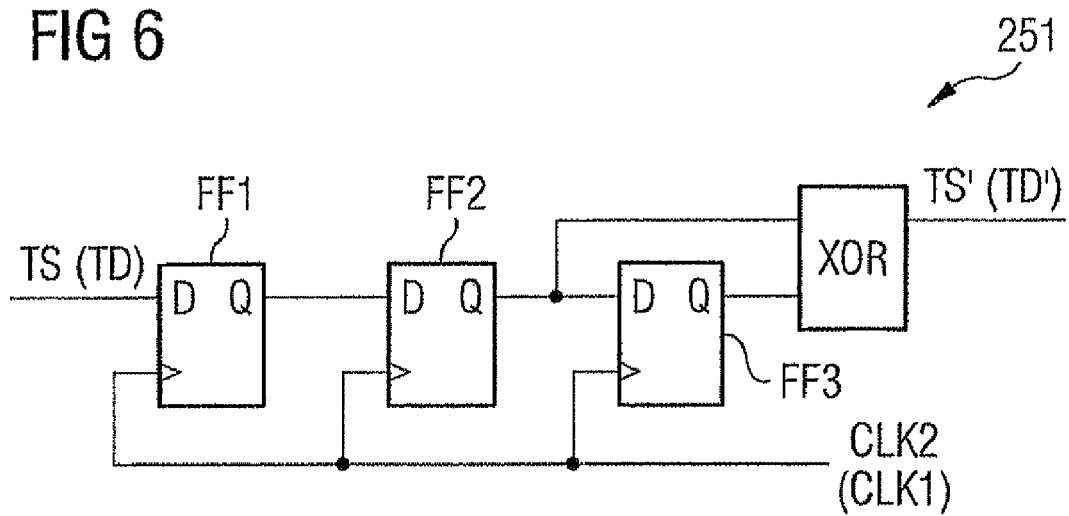
FIG. 6 shows a realization example of part of a signal processing circuit utilized in the processing and memory circuits.

FIG. 6 shows a realization example of a circuit 251 for generating the first subsidiary signal TS' from the transfer start signal TS. Said circuit 251 is part of the second signalizing circuit 25, to which the transfer start signal TS is fed, and which generates the transfer end signal TD. The circuit 251 comprises multiple—three in the example—cascading D flip flops, each having a clock input, to which the second clock signal CLK2 is fed. The transfer start signal TS is fed to the data input D of a first FF1 of the cascading flip flop; the output signal of the flip flop connected upstream in the cascade is fed to the data inputs D of the two other flip flops FF2, FF3. The cascading flip flops are, for example, positive edge triggered flip flops, which store the level of the signal present at the data input D thereof with each rising edge of the clock signal CLK2. If a level change of the transfer start signal TS present at the input of the first flip flop FF1 is present, the level of the input signal of the third flip flop FF3 changes at the beginning of the second clock period of the second clock signal CLK2 after said level change. During said second clock period the input signal of the third flip flop FF3 and the output signal thereof differ. The first subsidiary signal TS' is available in the signalizing circuit 25 illustrated in FIG. 6 at the output of a logic gate, for example an XOR gate, to the inputs of which the input signal and the output signal of the flip flop FF3 are fed. The first subsidiary signal TS' in this arrangement assumes a high level after the beginning of a second clock period after a level change during the point in time, during which the input signal and the output signal of the third flip flop FF3 differ with regard to their levels. A longer delay time between the point in time of a level change of the transfer start signal TS and the signal impulse of the subsidiary signal TS' as the delay of two clock periods explained may occur due to the frequency and phase difference of CLK1 and CLK2.

Figure 7A:
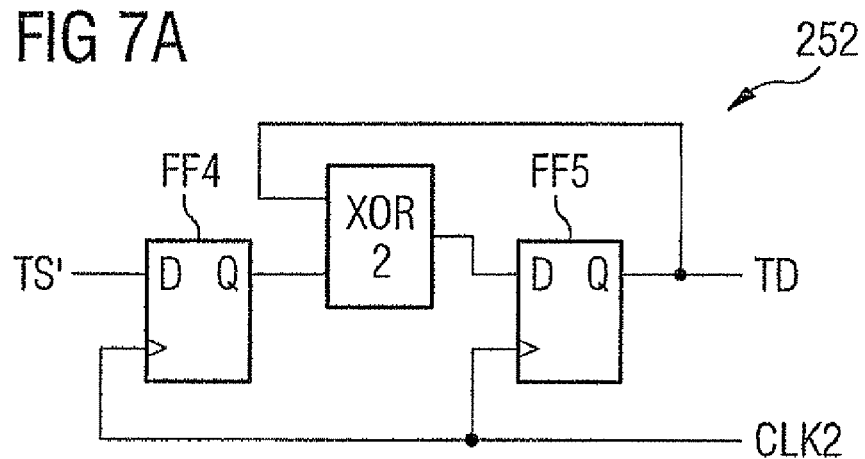
FIG. 7 shows a realization example of a further part of the signal processing circuit.

In order to generate the transfer end signal TD from the first subsidiary signal TS' the first signalizing circuit 25 has, for example, an additional circuit 252, an example of which is illustrated in FIG. 7A. The circuit illustrated has two additional D flip flops FF4, FF5, and an additional XOR gate XOR2. For this purpose the first subsidiary signal TS is fed to a first FF4 of said flip flops. The transfer end signal TD is available at the output of the second FF2 of said flip flops. The output signals of both flip flops FF4, FF5 are fed to the XOR gate XOR 2 as input signals, an output signal of the XOR gate XOR2 is fed to the second flip flop FF5 as an input signal. The flip flops FF4, FF4 are each clocked by means of the second clock signal CLK2. In this circuit the output signal of the first flip flop changes the level thereof at the beginning of a first clock period of the clock signal CLK2, after the subsidiary signal TS' has assumed a high level. A level change of the transfer end signal TD follows at a delay together with a clock period. The transfer end signal TO maintains the level thereof until a next impulse of the subsidiary signal TS'. The cause for this is the linkage of the output signal of the second flip flop FF5 to the output signal of the first flip flop FF4 via the XOR gate XOR2 and the fact that the subsidiary signal TS' also changes the level thereof at the time of a level change at the output of the second flip flop.

Figure 7B:
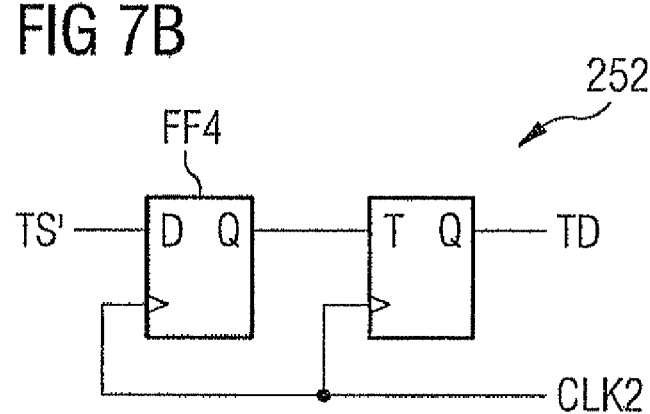

Another variation of the circuit 252 for generating the transfer end signal TD from the first subsidiary signal TS' is illustrated in FIG. 7B. In this circuit 252 a toggle flip flop is connected downstream of the first flip flop FF4, which has a toggle input, to which the output signal of the first flip flop FF4 is fed, and which is also clocked by the second clock signal CLK2. Said toggle flip flop always changes the level thereof and maintains the same further if a predetermined signal level—a high level in the example—is present at the input thereof at the time of a clock edge.

It should be noted that the circuits explained based on FIGS. 6 and 7 are to be understood merely as examples for generating the transfer end signal TD from the first subsidiary signal TS'. Of course, any additional circuits can be utilized, which are configured to generate a level change of the transfer end signal TD after a predetermined amount of clock periods after a level change of the transfer start signal TS. In the previously explained circuit the flip flops FF1-FF3 of the first circuit 25 function as a shift register, which delays the level change in order to provide a number of clock periods at the output of the flip flop chain FF1-FF3. For this purpose the first subsidiary signal marks the point in time, at which the level change reaches the end of the-flip flop chain. The first subsidiary signal TS' is required merely for the implantation explained above. In other implementations the subsidiary signal may optionally be omitted.

A release of the first memory 11 and of the address memory for writing with data newly to be transferred and with addresses is carried out in a time delayed manner after a level change of the transfer end signal TD by means of a release signal TD', the chronological sequence of which is also illustrated in FIG. 5. In the example illustrated said release signal is selected such that the same has a signal impulse after the completion of a predetermined amount of clock periods of the first clock signal CLK1, which releases the first memory 11 and the address memory 13 for writing in a manner not explained in further detail. Simultaneously, the first processor P1 may be signalized via the confirmation signal ACC that new data is being accepted for the transfer.

The generation of the release signal TD' in accordance with the first clock signal CLK1 is carried out by means of the first signalizing circuit 15. For this purpose the first signalizing circuit 15 may have a circuit corresponding to the circuit 251 according to FIG. 6. The circuit used in the first signalizing circuit 15 differs from the one illustrated in FIG. 6 only in that the transfer end signal TD and the first clock signal CLK1 are fed to the circuit of the first signalizing circuit 15, instead of the transfer start signal TS and the second clock signal CLK2, which is stated in FIG. 6 in parentheses. The generation of the confirmation signal ACC may also be carried out by the first signalizing circuit 15 in a manner not illustrated in further detail. In the example according to FIG. 5 three clock periods of the first clock signal CLK1 are waited for after a level change of the transfer end signal TD until the memories 11, 12 are released again.

The generation of a further level change of the transfer start signal TS for the transfer of new data occurs at the earliest at the same time, or after the signal impulse of the release signal. For this purpose additional information may be considered for the generation of the transfer start signal, which is supplied by the first processor P1 via the interface 14.

The processing of the transfer start signal TS in accordance with the second clock signal CLK2, in that after a level change of said transfer start signal TS a level change of the transfer end signal TD occurs only at a time delay after an amount of clock periods of the second clock signal CLK2, and the processing of the transfer end signal TD occurs in accordance with the first clock signal CLK1, in that after a level change of the transfer end signal TD a release of the memories 11, 13 in the first unit 10 occurs only at a time delay after an amount of clock periods of the first clock signal CLK1, ensures a safe transfer of the data from the first unit 10 to the second processing and memory unit 20.

During the write access previously explained based on the signal forms in FIG. 5 the data item WD present at the write input $20_4$ is relayed to the respective memory location of the register 21 via the first multiplexer 22, to which the address data ADR is fed at the address input $20_3$.

A read access to the register (21 in FIG. 4) arranged in the second clock domain is illustrated in FIG. 8 based on chronological signal forms. Said read access differs from the write access only in that data of the register are read from the address stated by the address data ADR, and put out to a read output $20_5$ of the second processing and memory unit 20 via the second multiplexer 23, and is read into the first data memory (11 in FIG. 3) from there. The reading of the data into said second data memory is carried out in a manner not illustrated in further detail at a predetermined signal level, in the example of a high level, the release signal TD'.

FIG. 9 schematically shows a data processing device having more than two clock domains, namely a first clock domain having a first processor P1 operating in accordance with a first clock CLK1, and additional clock domains, each having at least one processor $P2_1$, $P2_2$, $P2_n$. In the device illustrated the first processor P1 is connected to the interface circuit IF via a first data connection CON1, such as a data bus. The processors of the additional clock domains are each connected to the interface circuit IF via additional data connections $CON2_1$, $CON2_2$, $CON2_n$. Clocks of said additional clock domains are denoted in the following by $CLK2_1$, $CLK2_2$, $CLK2_n$.

The interface circuit IF has a first processing and memory unit 10 and a plurality of second processing and memory units $20_1$, $20_2$, $20_n$, which are connected to the additional data connections $CON2_1$, $CON2_2$, $CON2_n$. The first processing and memory unit 10, for example, is constructed corresponding to the unit 10 explained in FIG. 2, and the additional processing and memory units $20_1$, $20_2$, $20_n$, for example, are constructed corresponding to the unit 20 explained in FIG. 4. A further interface circuit 30 is arranged between the first processing and memory unit 10 and the additional processing and memory units $20_1 \ldots 20_n$, which is configured to relay the signals supplied by the first unit 10 to the respective second unit 10 in accordance with the address signal WADR. Advantage is being taken of the fact that all register addresses in the additional clock domains exist only once, and are therefore unique In this manner the respective clock domain can therefore be selected based on the register address such that the signals supplied by the first unit 10 can be relayed correctly to the processing and memory unit of the respective clock domain.

FIG. 10 shows a realization example of the further interface circuit 30. Said further interface circuit 30 comprises a number of multiplexers. In the example illustrated in FIG. 10 there are three multiplexers: a first multiplexer 31 for multiplexing the transfer start signal TS; a second multiplexer 35 for multiplexing the user data to be transferred by the second units, and stored in the first processing and memory unit 10; and a third multiplexer 36 for multiplexing the transfer end signal TD. The additional signal lines, such as the signal line for the write/read signal R/W, for the address data and for the data WD to be written, are fed to all additional processing and memory units.

The interface circuit 30 further has an address decoder 37, to which the address data ADR is fed, and which controls the multiplexers 31-36 as a function of said address data ADR.

The previously explained method, or the previously explained interface circuit, respectively, is suitable for any clock relationships between the first clock rate CLK1 and the second clock rate CLK2. Said clock relationship may also change, particularly during the performance of the method, or the operation of the interface circuit. This is possible by means of the "handshake" procedure performed in the method explained utilizing the transfer start signal TS and the transfer end signal TD, optionally in combination with the first subsidiary signal TS' and the release signal TD'.

The method explained, or the interface circuit explained, respectively, saves resources, e.g. can be realized using only little circuit technical efforts.

The invention claimed is:

1. A method for transferring data between a first clock domain having a first clock rate and at least one additional clock domain having a second clock rate, wherein the data is transferred from the first clock domain to the at least one additional clock domain, the method comprising:
    reading in of a data item in accordance with the first clock rate into a first memory, and locking of the first memory after saving the data item,
    signalizing a transfer start after saving the data item in the first memory by means of a transfer start signal,
    reading out the data item from the first memory, and reading in the data item into a second memory, each according to the second clock rate,
    processing the transfer start signal according to the second clock rate for generating a transfer end signal,
    processing the transfer end signal according to the first clock rate for generating a release signal and releasing the first memory as a function of the release signal,
    wherein a level change of the transfer end signal is generated according to a default number of clock period of the second clock rate after a level change of the transfer start signal, and
    wherein the generating of a level change of the transfer end signal occurs utilizing a first subsidiary signal, which is generated according to a default number of clock periods of the second clock rate after a level change of the transfer start signal.

2. The method according to claim 1, wherein a transfer start is signalized via a level change of the transfer start signal.

3. The method according to claim 2, wherein a level change of the transfer end signal is generated according to a default number of clock period of the second clock rate after a level change of the transfer start signal.

4. The method according to claim 3, wherein a level change of the release signal is generated according to a default number of clock periods of the first clock rate after a level change of the transfer end signal.

5. The method according to claim 2, wherein a level change of the release signal is generated according to a default number of clock periods of the first clock rate after a level change of the transfer end signal.

6. The method according to claim 1, wherein the first subsidiary signal is a signal impulse, the duration of which corresponds to that of a clock period of the second clock rate.

7. The method according to claim 6, wherein the transfer end signal is delayed as opposed to the beginning of a signal impulse of the subsidiary signal such that a level change of the transfer end signal is present after the beginning of default number of clock periods of the second clock rate after the beginning of the signal impulse of the subsidiary signal.

8. The method according to claim 6, wherein a level change of the release signal is generated according to a default number of clock periods of the first clock rate after a level change of the transfer end signal.

9. The method according to claim 7, wherein a level change of the release signal is generated according to a default number of clock periods of the first clock rate after a level change of the transfer end signal.

10. The method according to claim 1, wherein a level change of the release signal is generated according to a default number of clock periods of the first clock rate after a level change of the transfer end signal.

11. The method according to claim 1, wherein the transfer end signal is delayed as opposed to the beginning of a signal impulse of the subsidiary signal such that a level change of the transfer end signal is present after the beginning of default number of clock periods of the clock signal after the beginning of the signal impulse of the subsidiary signal.

12. The method according to claim 11, wherein a level change of the release signal is generated according to a default number of clock periods of the first clock rate after a level change of the transfer end signal.

13. The method according to claim 1, wherein a level change of the release signal is generated according to a default number of clock periods of the first clock rate after a level change of the transfer end signal.

14. The method according to claim 1, wherein a level change of the release signal is generated according to a default number of clock periods of the first clock rate after a level change of the transfer end signal.

15. A method for transferring data between a first clock domain having a first clock rate and at least one additional clock domain having a second clock rate, wherein the data is transferred from the at least one additional clock domain to the first clock domain, the method comprising:

reading in of a data item in accordance with the first clock rate into a first memory, and locking of the first memory after saving the data item, signalizing a transfer start after saving the data item in the first memory by means of a transfer start signal, reading out the data item from the first memory, and reading in the data item into a second memory, each according to the second clock rate, processing the transfer start signal according to the second clock signal for generating a transfer end signal, processing the transfer end signal according to the first clock rate for generating a release signal and releasing the first memory as a function of the release signal, wherein a level change of the transfer end signal is generated according to a default number of clock period of the second clock rate after a level change of the transfer start signal, and wherein the generating of a level change of the transfer end signal occurs utilizing a first subsidiary signal, which is generated according to a default number of clock periods of the second clock after a level change of the transfer start signal.

* * * * *